United States Patent
Potnuru et al.

(10) Patent No.: US 9,576,123 B2
(45) Date of Patent: Feb. 21, 2017

(54) PATTERN-BASED PASSWORD WITH DYNAMIC SHAPE OVERLAY

(71) Applicant: CA, INC., New York, NY (US)

(72) Inventors: Gowtham Sen Potnuru, Hyderabad (IN); Surya Kiran Satyavarapu, Hyderabad (IN); Souptik Sen, Hyderabad (IN); Steven Cornelis Versteeg, Hawthorn (AU)

(73) Assignee: CA, INC., New York, NY (US)

( * ) Notice: Subject to any disclaimer, the term of this patent is extended or adjusted under 35 U.S.C. 154(b) by 133 days.

(21) Appl. No.: 14/670,799

(22) Filed: Mar. 27, 2015

(65) Prior Publication Data

US 2016/0283709 A1    Sep. 29, 2016

(51) Int. Cl.
  *G06F 21/36*    (2013.01)
  *G06F 21/62*    (2013.01)
(52) U.S. Cl.
  CPC ........... *G06F 21/36* (2013.01); *G06F 21/6209* (2013.01)
(58) Field of Classification Search
  None
  See application file for complete search history.

(56) References Cited

U.S. PATENT DOCUMENTS

| | | | |
|---|---|---|---|
| 5,239,583 A | 8/1993 | Parillo | |
| 6,246,769 B1 | 6/2001 | Kohut | |
| 8,191,126 B2 | 5/2012 | Raghavan | |
| 2002/0029341 A1* | 3/2002 | Juels | G06F 21/36 713/184 |
| 2006/0018467 A1* | 1/2006 | Steinmetz | G06F 21/34 380/54 |
| 2006/0174339 A1* | 8/2006 | Tao | G06F 21/36 726/18 |
| 2010/0322485 A1* | 12/2010 | Riddiford | G06F 3/04842 382/115 |
| 2012/0159608 A1* | 6/2012 | Griffin | G09C 5/00 726/16 |
| 2012/0291120 A1* | 11/2012 | Griffin | G06F 21/36 726/19 |
| 2013/0326638 A1* | 12/2013 | Zander | G06F 21/604 726/28 |
| 2014/0053254 A1 | 2/2014 | Sun | |

* cited by examiner

*Primary Examiner* — Saleh Najjar
*Assistant Examiner* — Louis Teng
(74) *Attorney, Agent, or Firm* — Vierra Magen Marcus LLP (57) ABSTRACT

Methods for enabling pattern-based user authentication are described. During a registration phase for establishing user credentials, an end user of a computing device may select a matrix size for a matrix and select a shape of a shape size. The matrix of the matrix size may then be displayed and the shape of the shape size may be displayed such that the shape appears to overlay the matrix. The end user may move the shape over the matrix and as the shape is moved, the symbols of the matrix may be updated such that symbols arranged inside the boundary of the shape are not repeated, while one or more symbols arranged outside of the boundary of the shape are repeated. The order of symbols selected by the end user inside the boundary of the shape may be used to determine a pattern-based password.

20 Claims, 9 Drawing Sheets

PATTERN-BASED PASSWORD WITH DYNAMIC SHAPE OVERLAY

BACKGROUND

The present disclosure relates to systems and methods for enabling pattern-based user authentication.

Credentials may be used to gain access to information and/or computing resources (e.g., servers, storage devices, files, and computing applications). For example, an end user of a mobile device (e.g., a tablet computer) may provide user credentials, such as a user identifier and password, in order to gain access to native applications, web-based applications, or cloud-based applications accessible using the mobile device. In some cases, multi-factor authentication may be used in which more than one credential is required in order to gain access to applications running on the mobile device. For example, two-factor authentication may require the end user of the mobile device to provide two authentication factors before gaining access to the applications running on the mobile device. An authentication factor may comprise a knowledge factor (e.g., something the end user has knowledge of such as a password), a possession factor (e.g., something the end user has possession of such as a smart card or security token), or an inherence factor (e.g., something inherent only to the end user such as a biometric characteristic). Biometric characteristics may comprise distinguishing characteristics of the end user such as a fingerprint, a voice characteristic, or a facial characteristic.

BRIEF SUMMARY

According to aspects of the present disclosure, technology for enabling pattern-based user authentication is disclosed.

In some embodiments, during a registration phase for establishing user credentials, an end user of a computing device may select a matrix size for a matrix and select a shape of a shape size. The matrix of the matrix size may then be displayed and the shape of the shape size may be displayed such that the shape appears to overlay the matrix. The end user may move the shape over the matrix and as the shape is moved, the symbols of the matrix may be updated such that symbols arranged inside the boundary of the shape are not repeated, while one or more symbols arranged outside of the boundary of the shape are repeated. The order of symbols selected by the end user inside the boundary of the shape may be used to determine a pattern-based password.

In some embodiments, during an authentication phase for determining whether access to a resource should be granted, an authentication server may determine a user identifier associated with an end user, determine a shape and a shape size based on the user identifier, and generate a matrix based on the user identifier. The matrix may then be displayed and the shape of the shape size may be displayed such that the shape appears to overlay the matrix. The end user initiating the authentication request to access the resource may then move the shape over the matrix (e.g., using a touchscreen display or a computer pointing device such as a mouse) and an order of symbols selected by the end user inside the boundary of the shape may be acquired by the authentication server. The order of symbols selected by the end user may correspond with a pattern-based password.

In one embodiment, the authentication server may grant access to the resource based on the pattern-based password. In one example, the authentication server may grant access to the resource if the pattern-based password and a user identifier provided by the end user matches a registered pattern-based password and user identifier for accessing the resource. In another embodiment, the authentication server may grant access to the resource based on the pattern-based password and a position of the shape that overlays the matrix (e.g., in some cases, the end user may be required to position the shape over a particular region of the matrix prior to selecting the symbols in a particular order).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

As will be understood by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for enabling pattern-based user authentication. During a registration phase for establishing user credentials, an end user of a computing device may select a matrix size for a matrix and select a shape (e.g., a square, triangle, or circle) of a shape size. In some cases, the matrix size may be automatically selected based on a user identifier or a classification associated with the user identifier (e.g., whether the user identifier is classified as an owner, a manager, or an employee) or based on system preferences. The matrix of the matrix size may then be displayed (e.g., using a touchscreen display) and the shape of the shape size may be displayed such that the shape appears to overlay the matrix. The end user initiating the request for establishing the user credentials may then move the shape over the matrix (e.g., using a touchscreen display or a computer pointing device such as a mouse). As the shape is moved over the matrix, the symbols of the matrix may be regenerated or updated such that symbols or characters arranged inside the boundary of the shape are not repeated, while one or more symbols arranged outside of the boundary of the shape are repeated. The number of symbols that are repeated outside of the boundary of the shape may depend on the matrix size and/or the shape size. In some cases, symbols may be repeated inside of the boundary of the shape if the computing device is able to detect and output the locations of symbols within the matrix that are selected by the end user. The locations and order of symbols selected by the end user inside the boundary of the shape may then be determined and output in order to determine a pattern-based password.

In one embodiment, the registration phase may be performed by a registration server that is in communication with a mobile device used by the end user. In this case, data corresponding with the order of symbols selected by the end user inside the boundary of the shape or data associated with the matrix locations of the symbols selected by the end user may be encrypted by the mobile device prior to being transmitted to the registration server. In one example, a pattern-based password associated with the selected symbols may be encrypted prior to transmission. In another embodiment, the registration phase may be performed by a mobile device used by the end user in order to register user credentials for accessing protected resources (e.g., files or applications) located within the mobile device. The order or sequence of symbols selected by the end user may correspond with a pattern of cells within the boundary of a shape overlaying the matrix. The pattern of cells may be identified based on the order of symbols selected by the end user.

In some embodiments, an image of the matrix may be displayed to the end user using a display (e.g., black symbols on a white background). The matrix may include a plurality of cells arranged in rows and columns (e.g., a 18×20 matrix). Each cell within the matrix may include one or more symbols. In one example, a symbol may comprise a character or an alphanumeric symbol. A symbol may also include an ASCII character, a computer icon, or an emoticon. The symbols may be randomly generated or pseudo-randomly generated such that particular criteria are met, such as no redundant symbols appear within the boundary of a shape or such that one or more symbols outside of the boundary of the shape are duplicated. In some cases, at least a threshold number of symbols arranged outside of the boundary of the shape must be duplicated.

During an authentication phase for determining whether access to a resource (e.g., an application, a database, a file, a webpage, a computer program, a file system, a server, or a storage device) should be granted, an authentication server may determine a user identifier associated with an end user, determine a shape and a shape size based on the user identifier, and generate a matrix based on the user identifier. The matrix may then be displayed and the shape of the shape size may be displayed such that the shape appears to overlay the matrix. The end user initiating the authentication request to access the resource may then move the shape over the matrix (e.g., using a touchscreen display or a computer pointing device such as a mouse) and an order of symbols selected by the end user inside the boundary of the shape may be acquired by the authentication server. The order of symbols selected by the end user may correspond with a pattern-based password. In one embodiment, the authentication server may grant access to the resource based on the pattern-based password. In one example, the authentication server may grant access to the resource if the pattern-based password and a user identifier provided by the end user matches a registered pattern-based password and user identifier (or a registered userid/password mapping) for accessing the resource. In another embodiment, the authentication server may grant access to the resource based on the pattern-based password and a position of the shape that overlays the matrix (e.g., the end user may be required to position the shape over a particular region of the matrix prior to selecting the symbols in a particular order).

In one embodiment, the authentication phase may be performed by an authentication server that is in communication with a mobile device used by the end user. In this case, data corresponding with the order of symbols selected by the end user or corresponding with matrix locations of the symbols selected by the end user may be encrypted by the mobile device prior to being transmitted to the authentication server. In one example, a pattern-based password associated with the selected symbols may be encrypted prior to transmission. In another embodiment, the authentication phase may be performed by a mobile device used by the end user in order to grant access to protected resources (e.g., files or applications) located within the mobile device.

One issue with passwords is that because end users are inclined to register passwords that are easy to remember, security professionals often introduce rules for registerable passwords such as a minimum number of characters, at least one letter, at least one number, at least one uppercase, or at least one special character. One benefit of using a pattern-based password that is arranged within a shape overlay is that it may be easier for humans to remember patterns within the shape overlay compared with passwords that must satisfy complicated security rules. Further, security may be enhanced by repeating or duplicating characters (or other symbols) arranged outside of the boundary of a shape during the registration phase. Moreover, a user-registerable shape may prevent phishing issues as the shape of the overlay shape is an unknown factor (i.e., the registered shape may only be known to the end user who registered their user credentials). Thus, by registering a shape overlay of a particular shape, color, and/or size, the end user may prevent phishing attacks from stealing their usernames, passwords, and other sensitive information.

In some embodiments, an access control system may perform various functions for managing access to resources including authentication, authorization, and auditing. Authentication may refer to the process of verifying that credentials provided by a user or entity are valid or to the process of confirming the identity associated with a user or entity (e.g., confirming that a correct password has been entered for a given username). Authorization may refer to the granting of a right or permission to access a protected resource or to the process of determining whether an authenticated user is authorized to access a protected resource. Auditing may refer to the process of storing records (e.g., log files) for preserving evidence related to access control events. In some cases, an access control system may manage access to a protected resource by requiring authentication information or authenticated credentials (e.g., a valid username and password) before granting access to the protected resource. For example, an access control system may allow a remote computing device (e.g., a mobile phone) to access a protected resource, such as a file, webpage, application, or cloud-based application, via a web browser if valid credentials are provided to the access control system.

Figure 1:
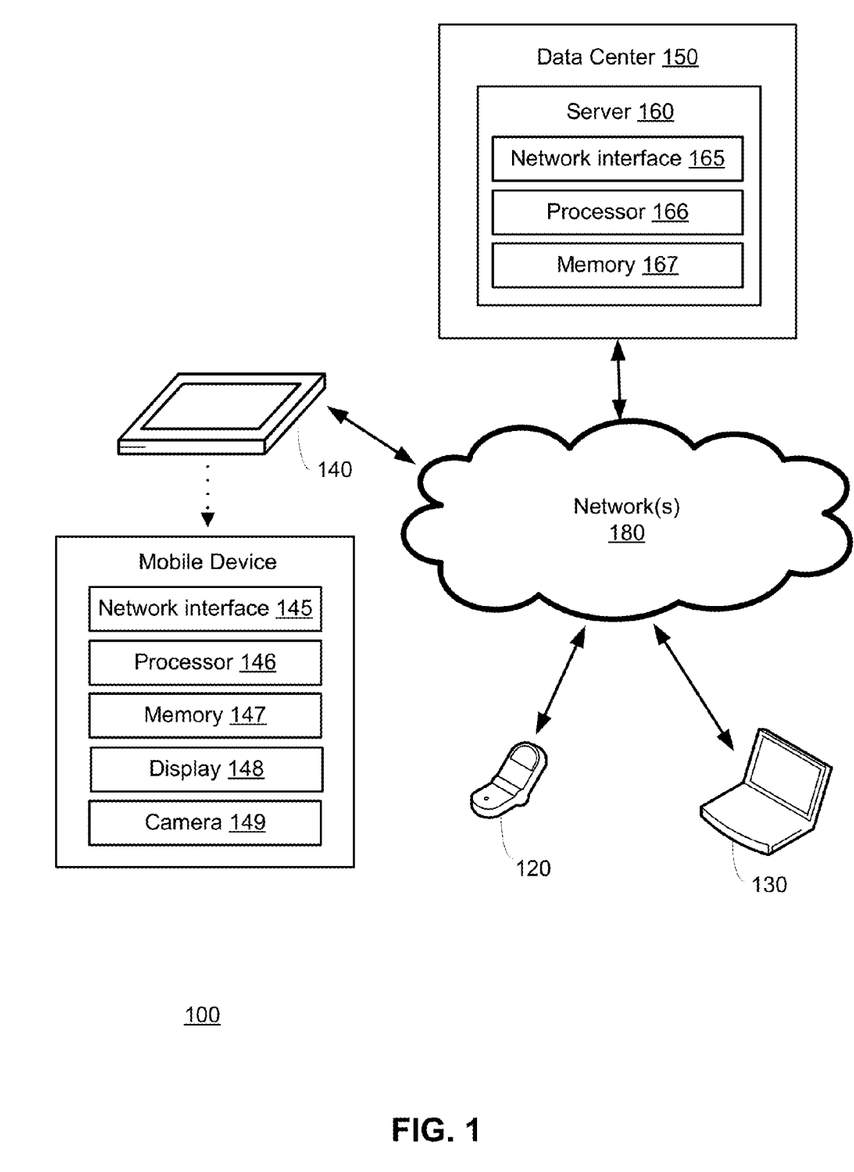
FIG. 1 is a block diagram of one embodiment of a networked computing environment.

FIG. 1 is a block diagram of one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile device 120, mobile device 130, mobile device 140, and server 160. The mobile device 140 may comprise a mobile phone, smart device (e.g., electronic watches and glasses), or tablet computer. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. The one or more networks 180 may include a cellular network, a mobile network, or a wireless network. Each network of the one or more networks 180 may include hubs, bridges, routers, switches, and wired transmission media such as a wired network or direct-wired connection.

One embodiment of mobile device 140 includes a network interface 145, processor 146, memory 147, display 148, and camera 149, all in communication with each other.

Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, Flash, etc.). Memory 147 may comprise a hardware storage device. Display 148 may comprise a touch-screen display. Camera 149 may include an image sensor for capturing images. Camera 149 may capture color images of an environment. The camera 149 may comprise an image capturing device for capturing one or more images of an environment or an object within the environment. The mobile device 140 may include outward facing cameras that capture images of the environment and/or inward facing cameras that capture images of the end user of the mobile device.

The data center 150 may include one or more servers, such as server 160, in communication with one or more storage devices. The servers and data storage devices within a data center may be in communication with each other via a networking fabric connecting servers data storage units within the data center to each other. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Memory 167 may comprise a hardware storage device.

In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

Networked computing environment 100 may provide a cloud computing environment for one or more computing devices. Cloud computing may refer to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In some embodiments, a server, such as server 160, may act as an authentication server for determining whether access to a resource (e.g., an application, a database, a file, a webpage, a computer program, a file system, a server, or a storage device) should be granted. The server may determine a user identifier associated with an end user, determine a shape and a shape size based on the user identifier, and generate a matrix based on the user identifier. The matrix may then be displayed and the shape of the shape size may be displayed such that the shape appears to overlay the matrix. The end user initiating the authentication request to access the resource may then move the shape over the matrix (e.g., using a touchscreen display or a computer pointing device such as a mouse) and an order of symbols selected by the end user inside the boundary of the shape may be acquired by the server. The order of symbols selected by the end user may correspond with a pattern-based password. In one embodiment, the server may grant access to the resource based on the pattern-based password. In one example, the server may grant access to the resource if the pattern-based password and a user identifier provided by the end user matches a registered pattern-based password and user identifier for accessing the resource. In another embodiment, the server may grant access to the resource based on the pattern-based password and a position of the shape that overlays the matrix (e.g., the end user may be required to position the shape over a particular region of the matrix prior to selecting the symbols in a particular order).

In one embodiment, a pattern-based password may only be determined via a selection of symbols that are arranged inside a closed shape overlay. In another embodiment, a pattern-based password may only be determined via a selection of symbols that are arranged outside a closed shape overlay. In other embodiments, an end user may select a pattern-based password across a matrix independent of the overlay shape. In some cases, an overlap shape may comprise an open shape.

Figure 2A:
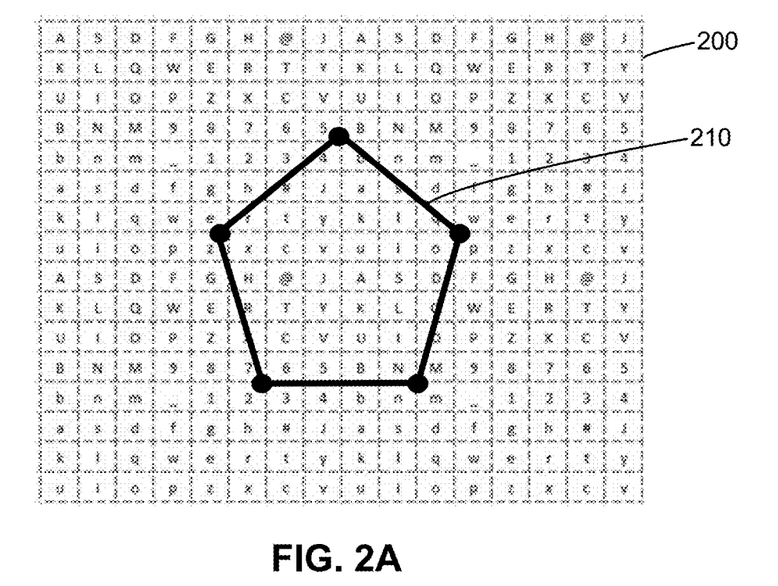
FIGS. 2A-2B depict embodiments of a matrix and a shape overlay that appears to overlay the matrix.

FIG. 2A depicts one embodiment of a matrix 200 and a shape overlay 210 that appears to overlay the matrix 200. As depicted, the matrix 200 comprises cells arranged in a 16×16 matrix. Each cell includes a symbol. The shape comprises a pentagon or a five-sided shape generated based on five points selected by an end user of a computing device. As depicted, symbols that are arranged outside of the boundary of the shape may be duplicated outside the boundary of the shape, while symbols that are arranged inside the boundary of the shape may not be duplicated inside the boundary of the shape. In one example, inside the boundary of the shape 210 is the symbol "@" and outside the boundary of the shape 210 are three symbols "@." In another example, inside the boundary of the shape 210 is the symbol "A" and outside the boundary of the shape 210 are three symbols "A."

Figure 2B:
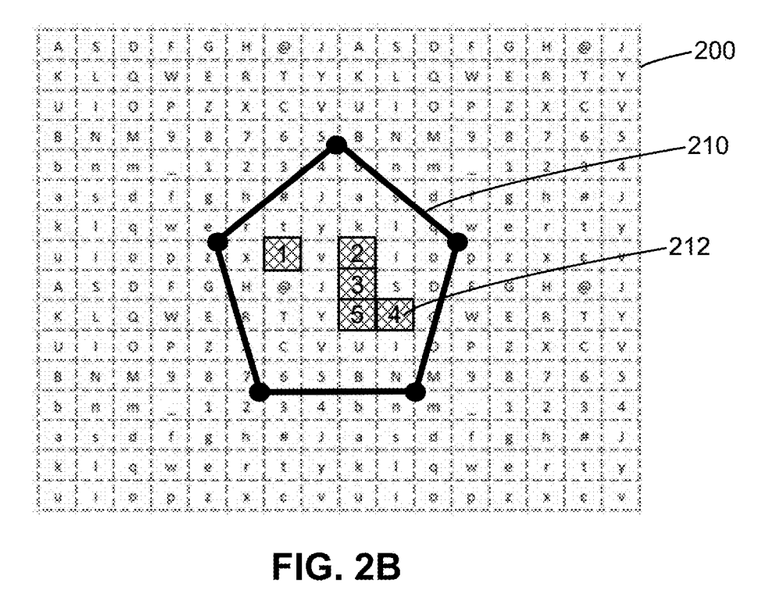

FIG. 2B depicts one embodiment of the matrix 200 of FIG. 2A and shape overlay 210 in which an end user of a computing device (e.g., a laptop, a mobile device, or a computing device that includes a touchscreen) has selected five symbols within the shape overlay 210 corresponding with the sequence of symbols "cuALK." The selected symbols may comprise a non-continuous pattern, such as "cuALK," or a continuous pattern, such as "cvuiS." The selected symbols, such as the fourth symbol 212 of the sequence of symbols, may be selected using a touchscreen interface a touchpad, or a pointing device, such as a computer mouse. In some embodiments, rather than transmitting a sequence of selected symbols in order to identify the pattern-based password, the positions of selected symbols may be transmitted in order to identify the pattern-based password. In this case, symbols residing inside the boundary of the shape may be duplicated as the position information may be used to distinguish the duplicated symbols from one another.

Figure 3A:
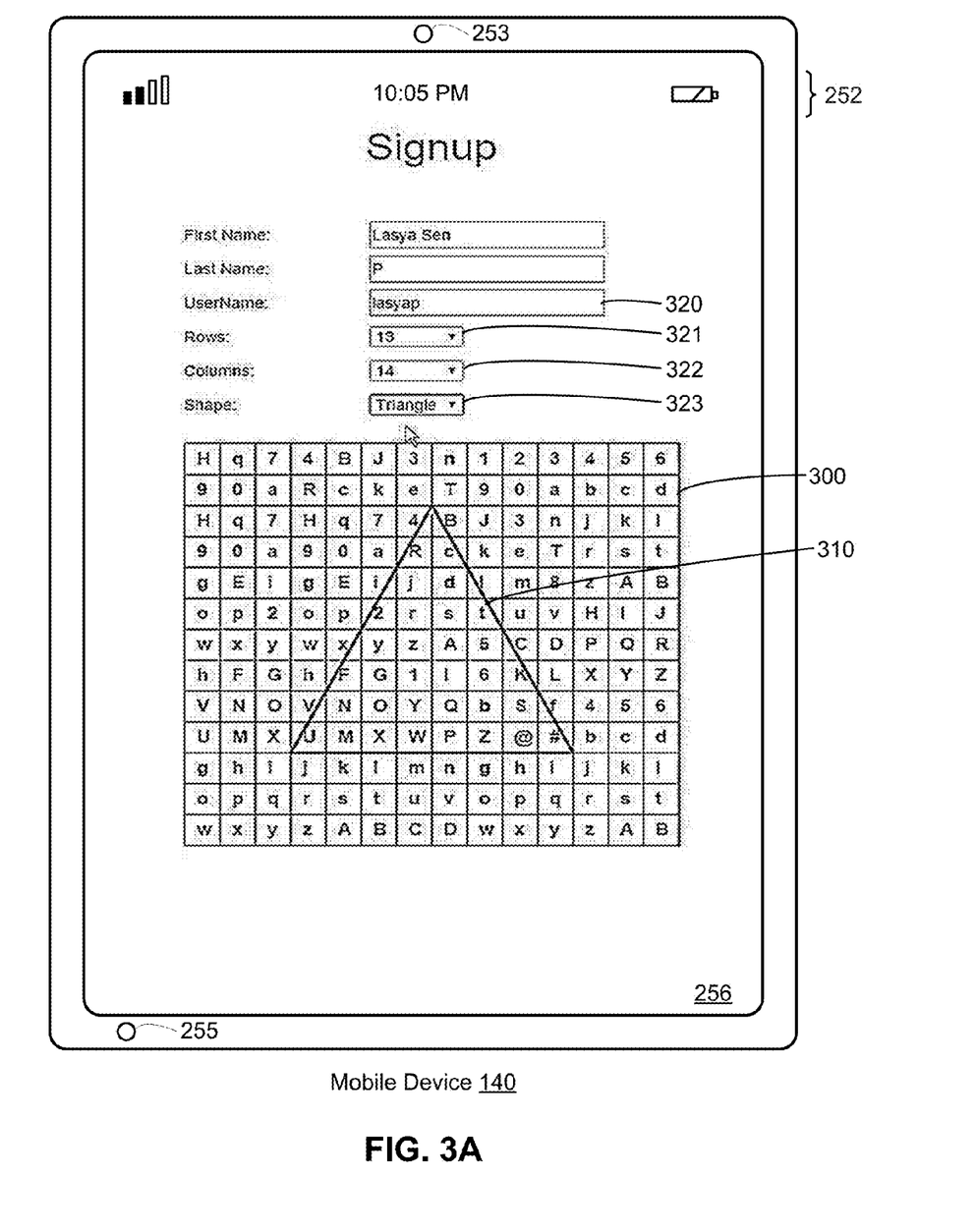
FIG. 3A depicts one embodiment of a mobile device in which an end user of the mobile device has initiated a registration phase for establishing user credentials for accessing a resource.

FIG. 3A depicts one embodiment of the mobile device 140 of FIG. 1 in which an end user of the mobile device has initiated a registration phase for establishing user credentials for accessing a resource (e.g., an application or a webpage). As depicted, mobile device 140 includes a touchscreen display 256, a microphone 255, and a front-facing camera 253. The mobile device 141 may also include a rear-facing camera (e.g., located on the backside of the mobile device). The touchscreen display 256 may include an LCD display for presenting a user interface to an end user of the mobile device. The touchscreen display 256 may include a status area 252 which provides information regarding signal strength, time, and battery life associated with the mobile device. The microphone 255 may capture audio associated with the end user (e.g., the end user's voice) for determining the identity of the end user. The front-facing camera 253 may be used to capture images of the end user for determining the identity of the end user. The mobile device may include a web browser for loading and viewing webpages.

As depicted in FIG. 3A, the end user has entered a username 320 (or user identifier), has selected the number of matrix rows 321 for a matrix, has selected the number of matrix columns 322 for the matrix, and has selected the shape 323 of an overlay shape. In response, the end user is provided with an image of the matrix 300 and the overlay shape 310. The end user may move the overlay shape 310 over the displayed matrix 300 and position the overlay shape 310 such that a plurality of cells of the matrix 300 are located inside of or within the boundary of the overlay shape 310.

Figure 3B:
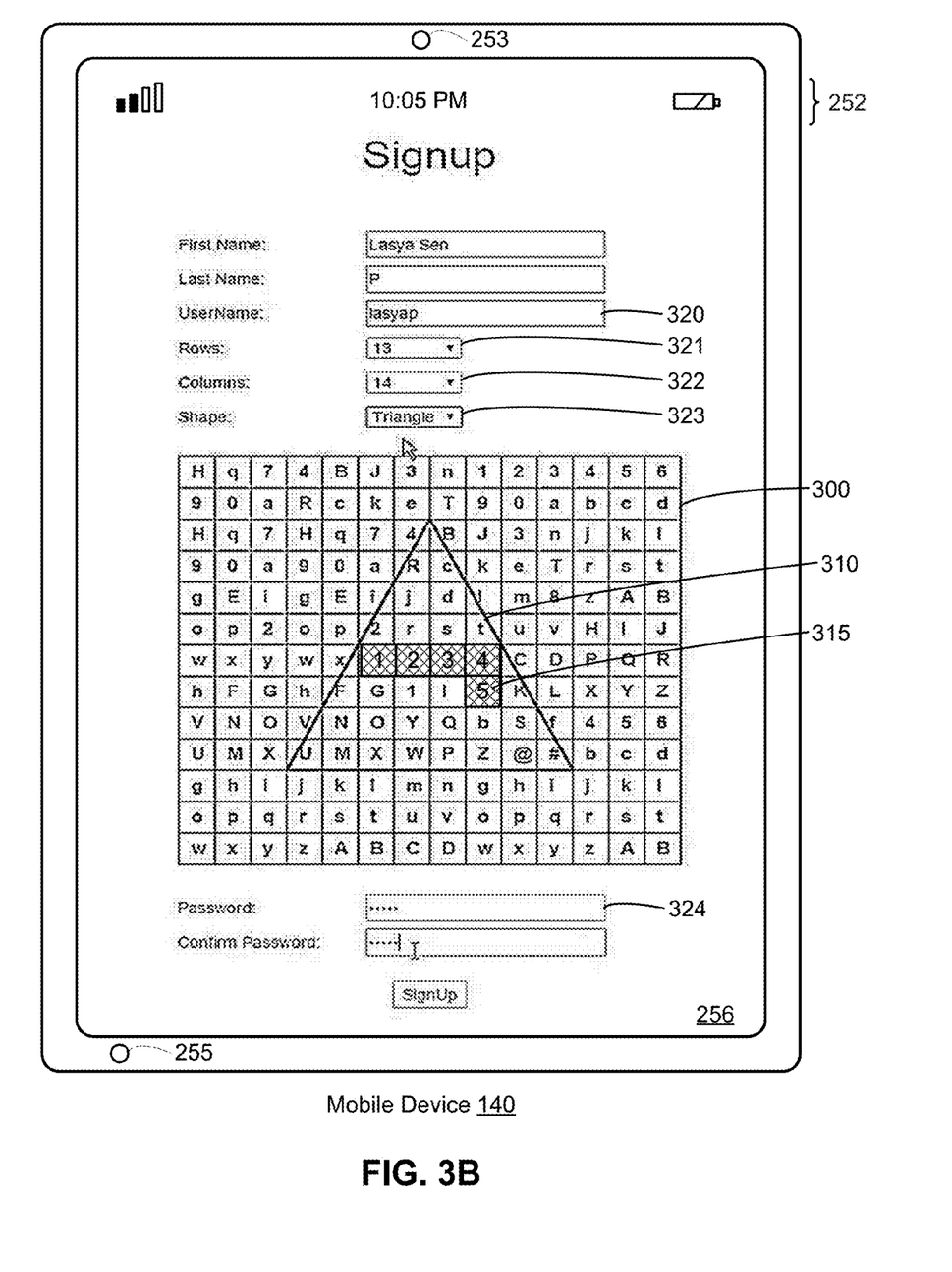
FIG. 3B depicts one embodiment of a mobile device in which the end user of the mobile device has selected a sequence of symbols during the registration phase.

FIG. 3B depicts one embodiment of the mobile device 140 of FIG. 3A in which the end user of the mobile device has selected a sequence of symbols during the registration phase for establishing user credentials for accessing the resource. As depicted, the end user has selected symbols within the overlay shape 310 corresponding with the sequence of symbols "yzA56." The sequence of symbols "yzA56" comprises a continuous pattern and may be automatically entered within a selected symbol field 324 or password field in response to the selection of the sequence of symbols. The selected symbols, such as the fifth symbol 315 of the sequence of symbols, may be selected using a touchscreen interface or touch sensitive pad. In some cases, the end user may be required to confirm the selected password by reselecting the sequence of symbols. Once the selected symbol field 324 has been filled, the username 320 and the selected symbols may be submitted to a registration server, such as server 160 in FIG. 1, in order to complete the registration phase. In some embodiments, rather than transmitting the symbols that have been selected by the end user, the position of the overlay shape 310 and the positions of the selected symbols within the overlay shape may be transmitted to the registration server in order to determine the pattern-based password associated with the selected symbols. In some embodiments, the registration phase may comprise a signup phase, in which the end user selects a pattern of cells of a matrix or grid and a pattern-based password is determined based on the selected pattern of cells.

Figure 3C:
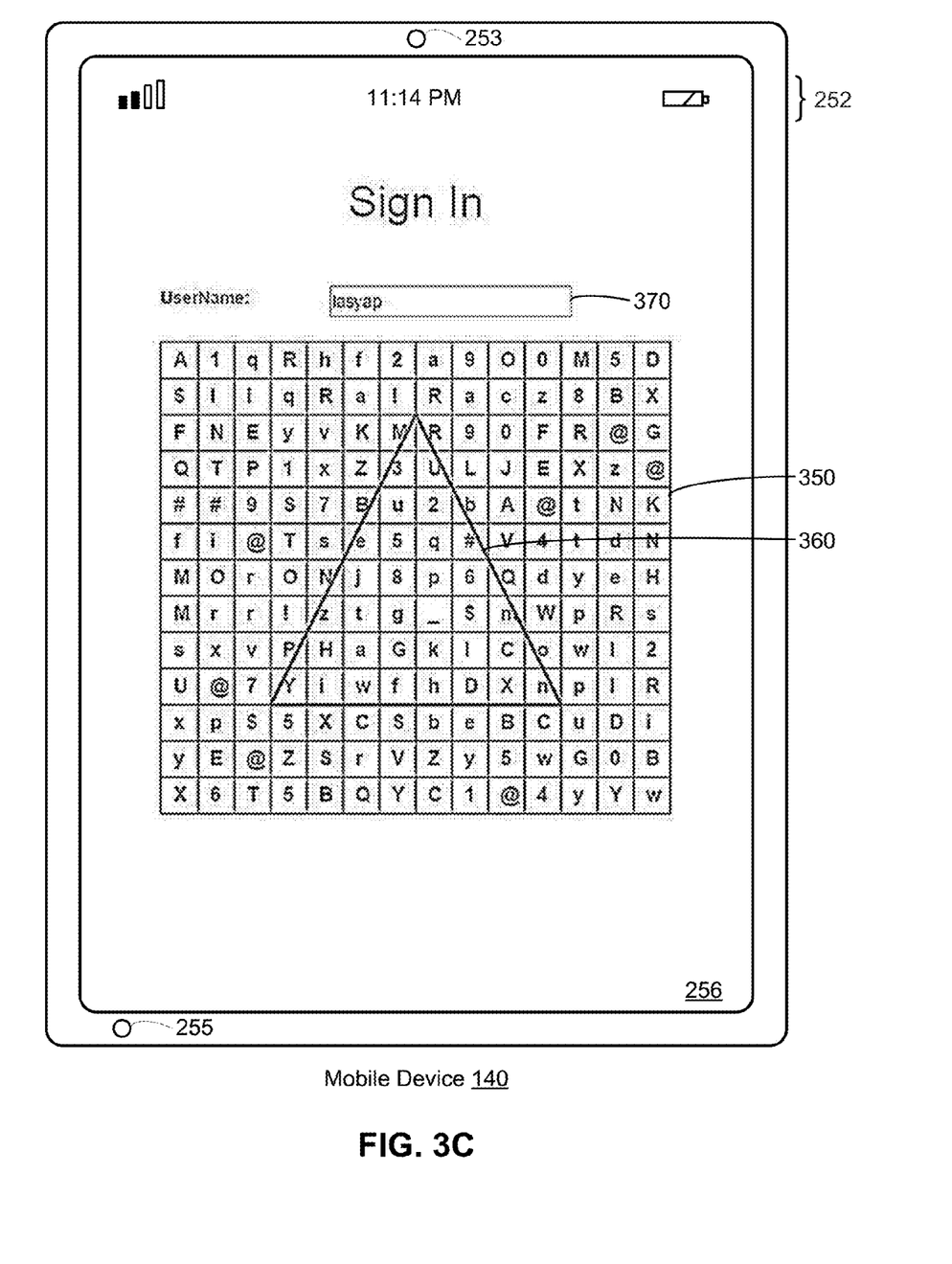
FIG. 3C depicts one embodiment of a mobile device in which an end user of the mobile device has initiated an authentication phase for determining whether access to a resource should be granted.

FIG. 3C depicts one embodiment of the mobile device 140 of FIG. 1 in which an end user of the mobile device has initiated an authentication phase for determining whether access to a resource (e.g., an application, a database, a file, a webpage, a computer program, a file system, a server, or a storage device) should be granted. As depicted, the end user of the mobile device has entered a username 370, which has in turn caused a matrix 350 and an overlay shape 360 to be displayed. The shape of the overlay shape 360 and the size of the matrix 350 may have been selected by the end user during a prior registration phase. As such, the end user may have knowledge of the particular shape of the overlay shape 360 and the size of the matrix 350 that were selected during the registration phase, and in the event that the size of the matrix 350 or the particular shape of the overlay shape 360 are not the same as those selected during the registration phase, the end user may decide not to enter user credentials due to possible phishing concerns.

Figure 3D:
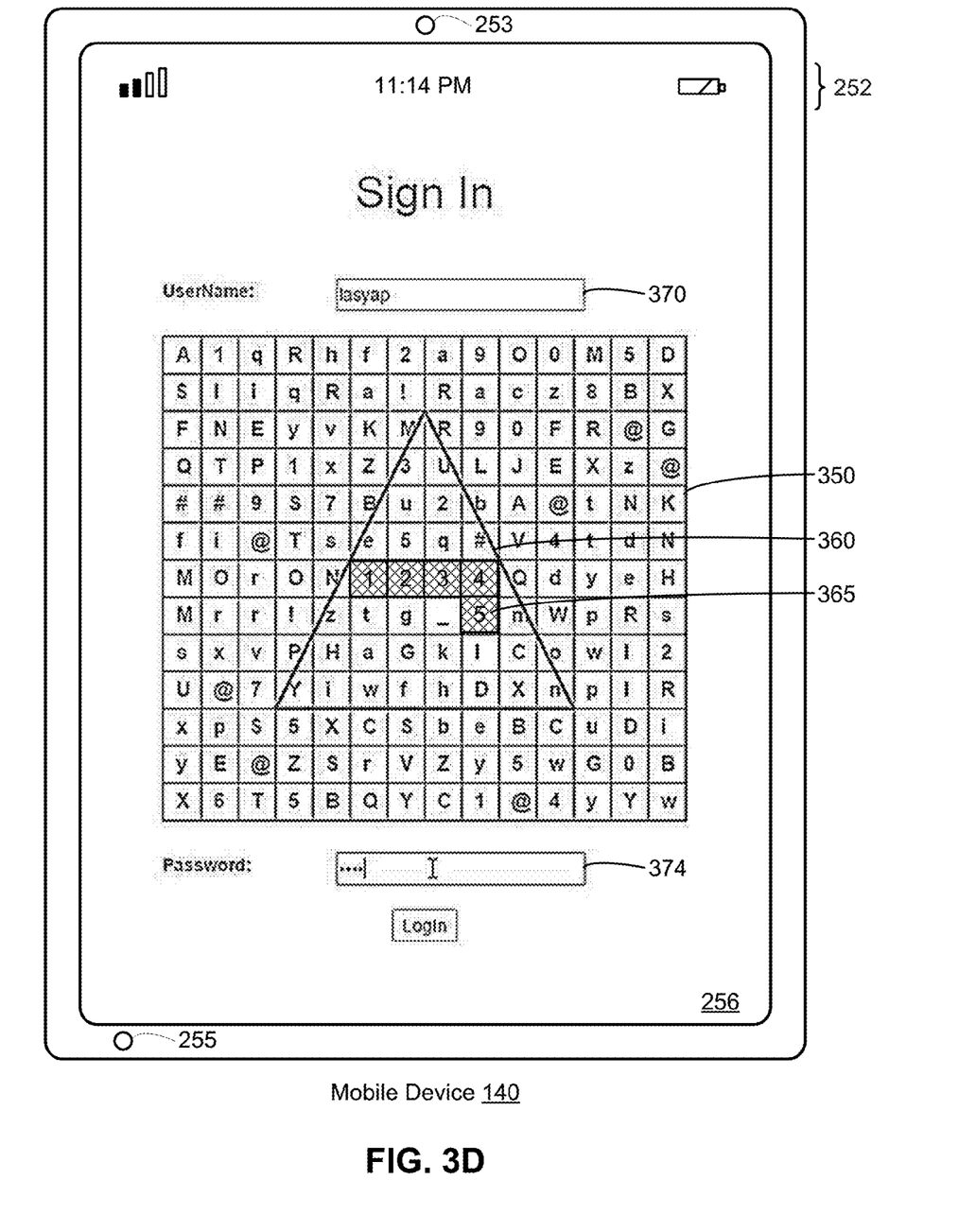
FIG. 3D depicts one embodiment of a mobile device in which the end user of the mobile device has selected a sequence of symbols during an authentication phase for determining whether to grant access to a resource.

FIG. 3D depicts one embodiment of the mobile device 140 of FIG. 3C in which the end user of the mobile device has selected a sequence of symbols during the authentication phase for determining whether to grant access to the resource. The end user of the mobile device may position the overlay shape 360 over the matrix 350 and then select a sequence of symbols inside the boundary of the overlay shape 360. As depicted, the selected symbols may comprise a continuous pattern, such as "j8p6S." The selected symbols, such as the fifth symbol 365 of the sequence of symbols, may be selected using a touchscreen interface or touch sensitive pad. The selected symbols may be automatically entered into or automatically populate a selected symbol field 374 or password field. Once the selected symbol field 374 has been filled, the username 370 and the selected symbols may be submitted to an authentication server, such as server 160 in FIG. 1, in order to complete the authentication phase. In some embodiments, rather than transmitting the symbols that have been selected by the end user, the position of the overlay shape 360 and the positions of the selected symbols may be transmitted to the authentication server in order to determine the pattern-based password associated with the selected symbols.

In some embodiments, during a subsequent authentication phase, a new matrix including randomly generated symbols may be presented to the end user. In this case, the end user may position the overlay shape 360 over the new matrix and select a new sequence of symbols located inside the boundary of the overlay shape 360 in order to automatically populate the selected symbol field 374. Although the symbol values selected by the end user during the subsequent authentication phase may be different from those selected in FIG. 3D, the pattern of the new sequence of symbols may correspond with a matching pattern-based password for the username 370. In this case, the cells and the order of cells selected within the new matrix may correspond with the pattern-based password.

Figure 4A:
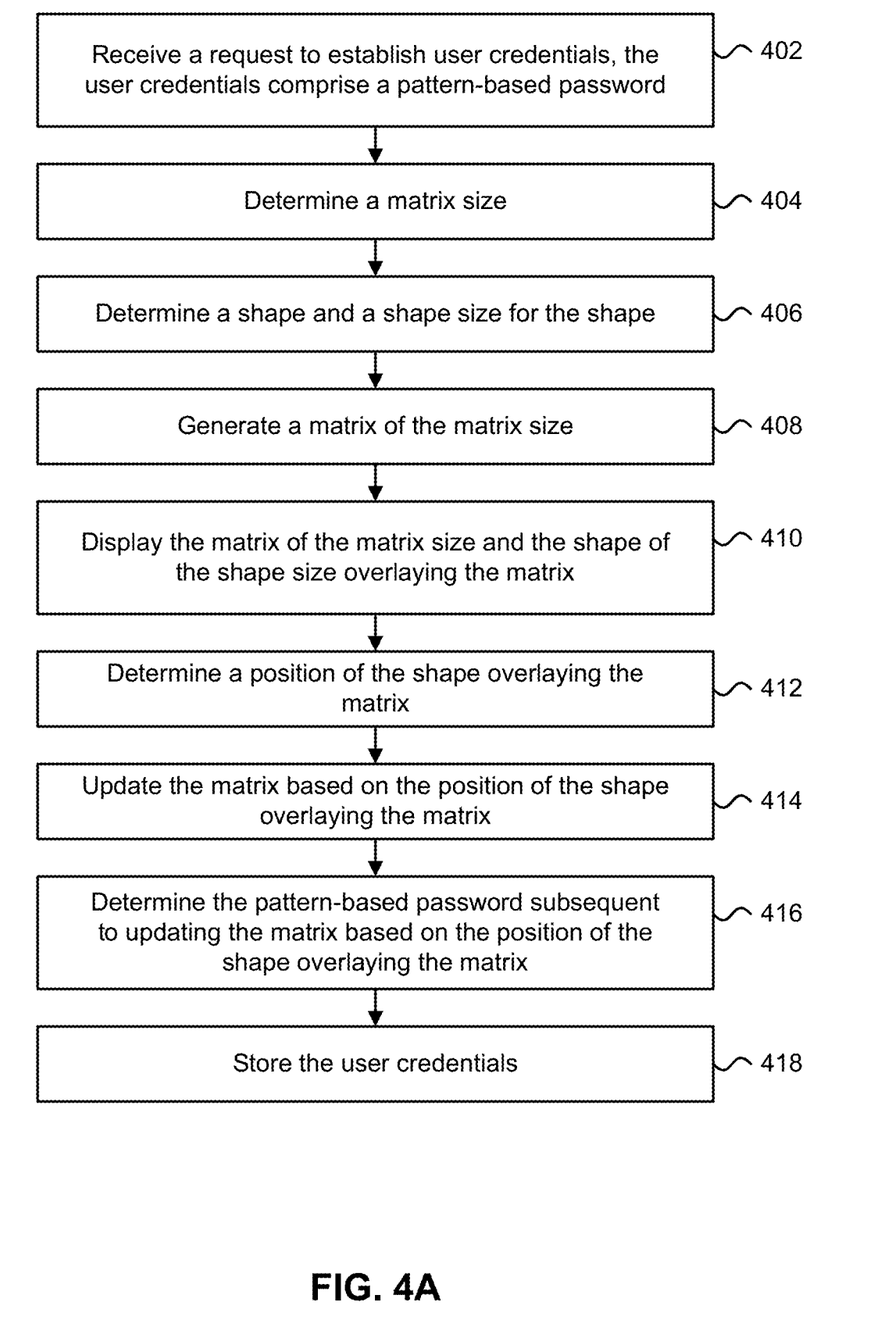
FIG. 4A is a flowchart describing one embodiment of a process for establishing user credentials using a computing device.

FIG. 4A is a flowchart describing one embodiment of a process for establishing user credentials using a computing device. In one embodiment, the process of FIG. 4A may be performed by a mobile device, such as mobile device 140 in FIG. 1.

In step 402, a request to establish user credentials is received. The user credentials may comprise a pattern-based password. The pattern-based password has correspond with an order of selected cells within a two-dimensional image or matrix. The matrix may correspond with cells arranged between horizontal and vertical grid lines. The user credentials may comprise a username and a corresponding pattern-based password for accessing a protected resource, such as an application, a database, a file, or a webpage. In step 404, a matrix size is determined. In step 406, a shape and a shape size for the shape is determined. The shape may comprise a closed shape in which a boundary of the shape may be used to determine symbols that reside inside the boundary of the shape and to determine other symbols that reside outside the boundary of the shape. The shape may comprise, for example, a polygon, a circle, a square, or a triangle. The matrix size may be determined via a selection by an end user of a computing device or determined automatically based on the protected resource for which the user credentials will apply or based on an identification or classification of the end user (e.g., the end user may be classified as an employee of a company or as a member of a group). The shape size for the shape may be determined based on the matrix size. The shape may be selected by the end user using a pull-down menu. In some cases, the end user may also select a color for the shape. In step 408, a matrix of the matrix size is generated. The generated matrix may include a plurality of randomly or pseudo-randomly generated symbols.

In step 410, the matrix of the matrix size and the shape of the shape size are displayed. The matrix and the shape may be displayed using a display or a touchscreen display. The shape may be displayed such that the shape overlays the matrix. In step 412, a position of the shape overlaying the matrix is determined. In one example, the end user may reposition the shape overlaying the matrix prior to selecting a sequence of symbols and the position of the shape overlaying the matrix may correspond with the repositioning of the shape prior to selection of the sequence of symbols. In step 414, the matrix is updated based on the position of the shape overlaying the matrix. In one example, the matrix may be updated and/or the symbols within the matrix may be updated such that symbols appearing inside the boundary of the shape only appear once, while other symbols that reside outside the boundary of the shape may be duplicated (e.g., matrix generation rules may require that every symbol outside the boundary of the shape must be duplicated or at least ten of the symbols outside the boundary of the shape must be duplicated). In some cases, at least a threshold number of symbols that reside outside the boundary of the shape must be duplicated. In other cases, the repetition of characters or symbols outside the boundary of the shape may be configured based on configurable rules, such as a rule that repetitive characters are only needed if the number of alphabet characters are less than the number of characters required to populate the entire matrix or grid. In step 416, the pattern-based password is determined subsequent to updating the matrix based on the position of the shape overlaying the matrix. In step 418, the user credentials including the pattern-based password are stored. In one example, the user credentials may be stored using a registration server.

Figure 4B:
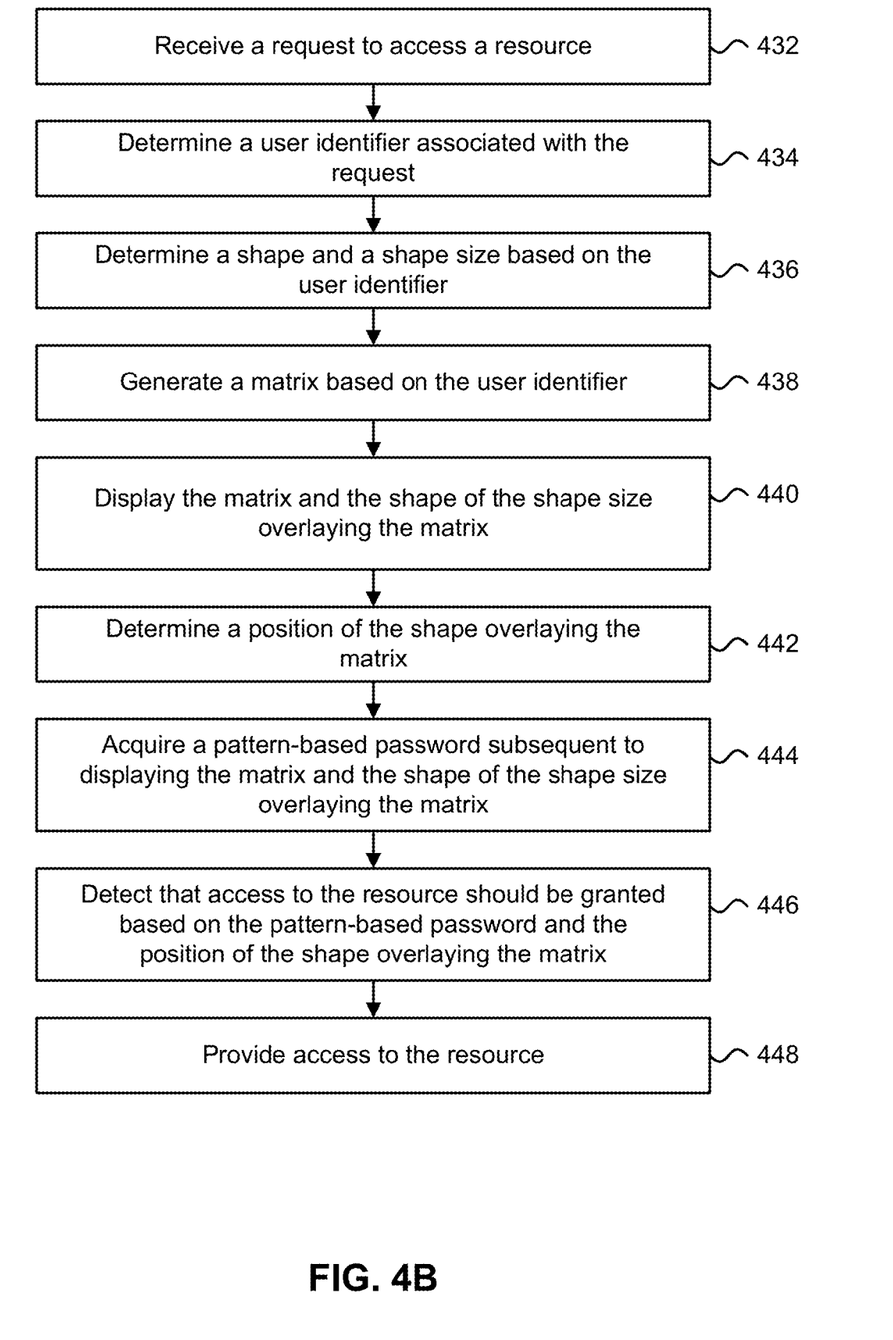
FIG. 4B is a flowchart describing one embodiment of a process for authenticating user credentials using a computing device.

FIG. 4B is a flowchart describing one embodiment of a process for authenticating user credentials using a computing device. In one embodiment, the process of FIG. 4B may be performed by a mobile device, such as mobile device 140 in FIG. 1.

In step 432, a request to access a resource is received. The resource may comprise a computing resource. The resource may comprise an application, a computer program, a webpage, a database, or a set of files. In step 434, a user identifier associated with the request is determined. In one embodiment, the user identifier may correspond with a userid or a username provided by the end user requesting access to the resource. In step 436, a shape and a shape size is determined based on the user identifier. The shape and the shape size may be determined by accessing the shape and the shape size registered for the user identifier. In one example, the shape, the shape size, and the color of the shape may have been registered by the end user during a prior registration phase. In step 438, a matrix based on the user identifier is generated. The matrix may be generated based on a matrix size registered for the user identifier. The generated matrix may include a plurality of randomly or pseudo-randomly generated symbols. Each cell of the generated matrix may include one or more symbols. In one example, each cell of the generated matrix includes only one symbol. In some embodiments, a two-dimensional image with a plurality of regions in which each region includes a symbol may be generated in place of the matrix. In step 440, the matrix and the shape of the shape size may be displayed using a display or a touchscreen display. The shape may be displayed such that the shape overlays the matrix.

In step 442, a position of the shape overlaying the matrix is determined. In one example, the end user may reposition the shape overlaying the matrix prior to selecting a sequence of symbols and the position of the shape overlaying the matrix may correspond with the repositioning of the shape prior to selection of the sequence of symbols. The end user may reposition the shape overlaying the matrix using the touchscreen interface to move the shape into a particular position overlaying the matrix. In step 444, a pattern-based password is acquired or determined subsequent to displaying the matrix and the shape overlaying the matrix. In one embodiment, the pattern-based password may be determined by acquiring a sequence of symbols selected by the end user of the computing device and determining the pattern-based password based on the sequence of symbols selected by the end user. In step 446, is detected that access to the resource should be granted based on the pattern-based password. In this case, the user identifier and the pattern-based password entered by the end user may match the user identifier and pattern-based password registered for the user identifier. In some embodiments, it is detected that access to the resource should be granted based on the pattern-based password and the position of the shape overlaying the matrix. In this case, both the pattern-based password and the position of the shape overlaying the matrix must match the pattern-based password and the position of the shape registered for the user identifier. In step 448, access to the resource is provided in response to detecting that access to the resource should be granted.

One embodiment of the disclosed technology includes acquiring a user identifier associated with an end user of a computing device, the user identifier corresponds with registered user credentials for accessing a protected resource. The method further comprises determining a shape based on the user identifier, the shape comprises a closed shape, generating a matrix based on the user identifier, displaying the matrix and the shape such that the shape appears to overlay the matrix, determining a positioning of the shape made by the end user of the computing device in which a first set of symbols reside inside a boundary of the shape and a second set of symbols reside outside the boundary of the shape, determining a sequence of the first set of symbols selected by the end user of the computing device, identifying a pattern-based password based on the sequence of the first set of symbols, and granting access to the protected resource to the end user of the computing device if the pattern-based password and the user identifier match the registered user credentials for accessing the protected resource.

One embodiment of the disclosed technology includes a display in communication with a processor. The processor acquires a user identifier associated with an end user of a computing device. The user identifier corresponds with registered user credentials for accessing a protected resource. The processor determines a shape based on the user identifier. The shape comprises a closed shape. The processor generates a matrix based on the user identifier and causes the matrix and the shape to be displayed using the display such that the shape appears to overlay the matrix. The processor determines a positioning of the shape made by the end user of the computing device in which a first set of symbols reside inside a boundary of the shape and a second set of symbols reside outside the boundary of the shape. The processor determines a sequence of the first set of symbols selected by the end user of the computing device, identifies a pattern-based password based on the sequence of the first set of symbols, and grants access to the protected resource to the end user of the computing device if the pattern-based password and the user identifier match the registered user credentials for accessing the protected resource.

One embodiment of the disclosed technology includes receiving a request to establish user credentials for accessing a protected resource and acquiring a user identifier associated with an end user of a computing device. The user credentials comprise the user identifier and a pattern-based password. The method further comprises displaying a matrix and a shape such that the shape appears to overlay the matrix, determining a positioning of the shape made by the end user of the computing device in which a first set of symbols reside inside a boundary of the shape and a second set of symbols reside outside the boundary of the shape, updating the matrix based on the positioning of the shape, the second set of symbols comprises one or more duplicated symbols, determining a sequence of the first set of symbols selected by the end user of the computing device, identifying the pattern-based password based on the sequence of the first set of symbols, and storing the user credentials for accessing the protected resource.

Figure 5:
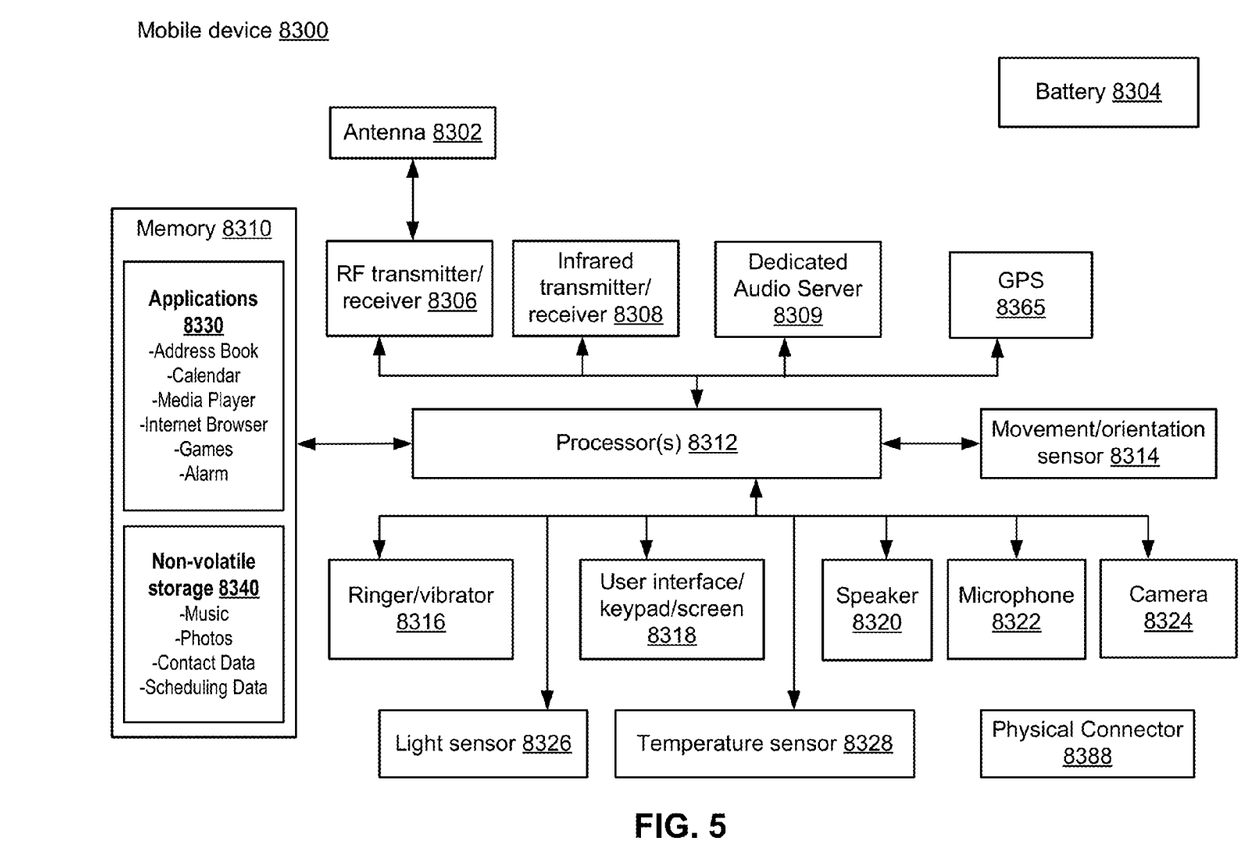
FIG. 5 depicts one embodiment of a mobile device.

The disclosed technology may be used with various computing systems. FIG. 5 depicts one embodiment of a mobile device 8300, which includes one example of an implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for enabling pattern-based user authentication, comprising:
   acquiring a user identifier associated with an end user of a computing device, the user identifier corresponds with registered user credentials for accessing a protected resource;
   determining a shape based on the user identifier, the shape comprises a closed shape;
   generating a matrix based on the user identifier, the matrix comprises a first set of symbols;
   displaying the matrix and the shape overlaying the matrix, the first set of symbols reside inside a boundary of the shape;
   determining a positioning of the shape made by the end user of the computing device in which the first set of symbols reside inside the boundary of the shape and a second set of symbols reside outside the boundary of the shape;
   determining a sequence of the first set of symbols selected by the end user of the computing device;
   identifying a pattern-based password based on the sequence of the first set of symbols; and
   granting access to the protected resource to the end user of the computing device if the pattern-based password and the user identifier match the registered user credentials for accessing the protected resource.

2. The method of claim 1, further comprising:
the granting access to the protected resource comprises granting access to the protected resource based on the pattern-based password and the positioning of the shape.

3. The method of claim 1, wherein:
the granting access to the protected resource is performed by the computing device.

4. The method of claim 1, further comprising:
encrypting the pattern-based password and transmitting the encrypted pattern-based password to a second computing device different from the computing device, the granting access to the protected resource is performed by the second computing device.

5. The method of claim 1, wherein:
the first set of symbols comprises a plurality of alphanumeric characters.

6. The method of claim 1, wherein:
the shape comprises one of a polygon, a square, a triangle, or a circle.

7. The method of claim 1, wherein:
the protected resource comprises one of an application, a database, a file, a webpage, a computer program, a server, or a storage device.

8. The method of claim 1, wherein:
the generating a matrix comprises determining a matrix size based on the user identifier and generating the matrix based on the matrix size; and
the determining a shape comprises determining a shape size and a shape color based on the user identifier.

9. The method of claim 1, wherein:
the identifying a pattern-based password comprises determining a set of symbol positions corresponding with the sequence of the first set of symbols and identifying the pattern-based password based on the set of symbol positions.

10. The method of claim 2, wherein:
the positioning of the shape corresponds with a position of the shape over the matrix during selection of the first set of symbols by the end user of the computing device.

11. A system, comprising:
a display; and
a processor in communication with the display, the processor acquires a user identifier associated with an end user of a computing device, the user identifier corresponds with registered user credentials for accessing a protected resource, the processor determines a shape based on the user identifier, the shape comprises a closed shape, the processor generates a matrix based on the user identifier, the processor causes the matrix and the shape to be displayed using the display, the processor determines a positioning of the shape made by the end user of the computing device in which a first set of symbols reside inside a boundary of the shape and a second set of symbols reside outside the boundary of the shape, the processor determines a sequence of the first set of symbols selected by the end user of the computing device, the processor identifies a pattern-based password based on the sequence of the first set of symbols, the processor grants access to the protected resource to the end user of the computing device if the pattern-based password and the user identifier match the registered user credentials for accessing the protected resource.

12. The system of claim 11, wherein:
the processor grants access to the protected resource based on the pattern-based password and the positioning of the shape.

13. The system of claim 11, wherein:
the first set of symbols comprises a plurality of alphanumeric characters.

14. The system of claim 11, wherein:
the shape comprises one of a polygon, a square, a triangle, or a circle.

15. The system of claim 11, wherein:
the protected resource comprises one of an application, a database, a file, a webpage, a computer program, a server, or a storage device.

16. A computer-implemented method for enabling pattern-based user authentication, comprising:
receiving a request to establish user credentials for accessing a protected resource;
acquiring a user identifier associated with an end user of a computing device, the user credentials comprise the user identifier and a pattern-based password;
displaying a matrix and a shape overlaying the matrix;
determining a positioning of the shape made by the end user of the computing device in which a first set of symbols reside inside a boundary of the shape and a second set of symbols reside outside the boundary of the shape;
updating the matrix based on the positioning of the shape, the second set of symbols comprises one or more duplicated symbols;
determining a sequence of the first set of symbols selected by the end user of the computing device;
identifying the pattern-based password based on the sequence of the first set of symbols; and
storing the user credentials for accessing the protected resource.

17. The method of claim 16, wherein:
the user credentials comprise the pattern-based password, the positioning of the shape overlaying the matrix, and the user identifier.

18. The method of claim 16, wherein:
the first set of symbols comprises a plurality of alphanumeric characters.

19. The method of claim 16, wherein:
the shape comprises one of a polygon, a square, a triangle, or a circle.

20. The method of claim 16, wherein:
the protected resource comprises one of an application, a database, a file, a webpage, a computer program, a server, or a storage device.

* * * * *